United States Patent [19]

Schuman

[11] 4,202,683

[45] * May 13, 1980

[54] FERTILIZER

[76] Inventor: Edwin K. Schuman, 100 W. 14th St., Rolla, Mo. 65401

[*] Notice: The portion of the term of this patent subsequent to Mar. 22, 1994, has been disclaimed.

[21] Appl. No.: 787,626

[22] Filed: Apr. 14, 1977

[51] Int. Cl.$^2$ .............. C05B 7/00; C05B 13/00; C05B 11/06; C05B 17/00

[52] U.S. Cl. .............................. 71/35; 71/34; 71/46; 71/50; 71/51; 71/53

[58] Field of Search .............. 71/36, 31, 34, 35, 46, 71/47, 49, 51, 53, 50

[56] References Cited

U.S. PATENT DOCUMENTS

| | | | |
|---|---|---|---|
| 2,950,183 | 8/1960 | Nikitin | 71/11 |
| 3,130,038 | 4/1964 | Thomas | 71/29 |
| 3,174,844 | 3/1965 | Bridger | 71/34 |
| 4,013,443 | 3/1977 | Schuman | 71/31 |

*Primary Examiner*—Joseph Scovronek
*Assistant Examiner*—C. P. Konkol
*Attorney, Agent, or Firm*—Schmidt, Johnson, Hovey & Williams

[57] ABSTRACT

Langbeinite ($2MgSO_4,K_2SO_4$) is reacted with diammonium phosphate ($(NH_4)_2HPO_4$) to yield a dry farm field fertilizer of grade 21-12-7+1.22 Mg.

The chemical process is also adjusted for a dry farm field "double cropping" fertilizer.

The cost of the basic liquid fertilizer containing Magnesium has been likewise reduced.

These fertilizers contain magnesium in the presence of phosphorus.

The micronutrients, Zn, Cu, Fe, Mn and B may be added in rates proportional to the deficiency shown by soil tests.

10 Claims, No Drawings

FERTILIZER

This invention relates to improvements in the fertilizers made under U.S. Pat. No. 4,013,443 issued to Edwin K. Schuman, Mar. 22, 1977.

It is an extension of the efforts to forestall predicted food shortages and energy crises by making the magnesium carrier cheaper and more abundant.

For this effort to be successful, it was necessary to fine a common agricultural product containing nitrogen and which would alos react with magnesium to form $MgHPO_4$. The reactions described herein are similar to U.S. Pat. No. 4,013,443 except those containing sodium.

The qualities necessary in a fertilizer to combat this food shortage are:
Increased amounts of nitrogen.
Minimal amount of sodium.
It must be available in large quantities.
Amenable to mechanized handling and application.
Reasonable in price.
Magnesium in readible usable form.

This applicant believes this invention, involving the substitution of diammonium phosphate in the products of U.S. Pat. No. 4,013,443, meets not only these qualities, but others to be cited below.

Diammonium phosphate as a source of a chemically-reactive phosphorus nutrient appears obvious. However, many attempts by the applicant failed over the past several years before he noticed that the rate of the reaction was too slow if there was a film of clear water above the phosphate solution (i.e. the concentration too low) and the temperature not in the 90° C. range.

The discovery that the rate of reaction was following the "collision theory" led to the time-saving successful processes, namely, that the amount of langbeinite $(2MgSO_4, K_2SO_4)$ and the time of boiling must be increased to increase the number of Mg and phosphorus ions per unit volume. They also needed the extra energy provided by a higher temperature; otherwise the reaction would not be satisfactory for fertilizer production. It was therefore, a new and different process.

Because diammonium phosphate contains 21.1% nitrogen and 53.7% phosphate while sodium dibasic phosphate contains no nitrogen, the fertilizer will be of higher grade, i.e. containing more nitrogen per nutrient unit, and thus be lighter per nutrient thereby saving labor in handling costs all through its distribution.

Diammonium phosphate $(NH_4)_2HPO_4$ is manufactured to be sold as an ingredient in fertilizer; is used extensively in farm-field fertilizers and ammonia solutions. It is also more abundant and cheaper than sodium dibasic phosphate. For example, it was exported in 1976 at 5.65¢ per pound.

Sodium dibasic phosphate $Na_2HPO_4$ is supplied by only a few companies, finding its use chiefly in the manufacturing of cheese substitutes. Its cost, about 30.15¢/lb, is enhanced by safeguards to health.

By virtue of this application and U.S. Pat. No. 4.013,443 the cost of the raw materials for the present fertilizer would drop from 20¢ per pound to 3.9¢ per pound for the magnesium, the phosphorus from 30.15¢ to 5.65¢ per pound, the potash from 4.8¢ to 4.62¢ at Missouri outlets.

It is an object of this invention to use the chemical properties of diammonium phosphate to produce the liquid and dry fertilizers similar to those of U.S. Pat. No. 4,013,443 at prices which are not prohibitive for farm field consumption. The basic or 8 original chemical reactions will be the same from a chemical standpoint as in U.S. Pat. No. 3,179,509 but beginning at equation No. 9 they will not be applicable because there is no sodium in $(NH_4)_2HPO_4$.

Examples of formulations of this invention are set forth below. The proportions of the constituents can be varied within operable limits without departing from the inventive concepts hereof.

A high analysis granular farm-field fertilizer, carrying Mg, is the result of this invention. Diammonium phosphate has been substituted for sodium dibasic phosphate in U.S. Pat. No. 4,013,443 and its preparation is as follows:

Twelve oz. av. of Langbeinite $(2MgSO_4,K_2SO_4)$ are added to a vessel containing 48 oz. of water at room temperature, and these are operably associated with an agitator.

The solution is slowly raised to a vigorous boil which is maintained until the volume of the fluid is about 16 oz. when the insols are removed by decnataion.

While the solution is still very hot, 16 oz. av. of diammonium phosphate $(NH_4)_2HPO_4$ are introduced to precipitate the released $MgSO_4$ to form $MgHPO_4$. This will occur rapidly if the temperature of the solution is near boiling and its volume does not greatly exceed that of the phosphate being introduced.

The reaction is halted by the addition of 6 oz. av. of muriate of potash $KCl-60\%K_2O$.

Next 0.24 oz. av. of borax $Na_2B_4O_7:10H_2O$, and one oz. av. of guar gum mixed with 34 oz. of ammonium nitrate $(NH_4)NO_3$ having 34%N are added in bulk and the mixture is stirred until it assumes liquidity and becomes homogeneous. It is poured into ⅛ inch thin layers or molds to harden and dry sufficiently to be ground into a granular fertilizer, to be spread on the fields or in the rows using farm machinery or packaged into specialties which are used dry or properly diluted. It has an analysis of 20.6-11.9-2+1.22 Mg which is easily changed to 21-12-7 +1.22. The amount to be used depends upon the results of a soil test.

For house plants and garden uses 1 tbsp full is added to 1 gal of water to be poured around the roots as one would ordinarily water them. It will harden in a few hours. It can be finely ground in about 24 hours if cool dry air is passed over it.

This fertilizer is fully reacted. The reactions to render the nutrients available have already occurred. There is nothing left for the chemical media and the microflora in the soil to perform.

It is possible to reach a half-way point in this process. One half (or thereabouts) can be reacted while the remainder awaits the action of the soil, the heat and humidity. This would be a "slow release" feature using one system to fertilize immediately, the other to apply nutrients in a mixture for later use. The process for the ¼ reacted fertilizer is as follows:

12 oz. av of Langbeinite $(2MgSO_4,K_2SO_4)$ are added to a vessel containing 20 oz. av. of water at room temperature and they are operably associated with an agitator.

The temperature of the solution is slowly raised to boiling, to remain there for about 10 minutes when the volume should be reduced to 15½ oz.

The insols are left in the solution to which 16 oz. av. of diammonium phosphate $(NH_4)_2HPO_4$ are added to precipitate the released $MgSO_4$.

The reaction is halted by the admittance of 8 oz. av. of muriate of potash, KCl grade 60% $K_2O$.

Next 0.24 oz av, of Borax ($Na_2B_4O_7:10H_2O$), and 1.33 oz. av. of guar gum mixed into 34 oz. av. of ammonium nitrate ($NH_4)NO_3$ are added in bulk. The mixture is then stirred until it assumes liquidity and becomes homogeneous. It is then poured into thin-inch layers (or molds) to harden and dry sufficiently to be ground into a granular fertilizer. It has a grade of 17.4-10-8.64 +1.63 Mg; it would be beneficial in low Mg areas or applications involving grass tetany.

This partly soluble fertilizer is to be broadcast over the field, or in the rows during "preemergence" periods or used later in side dressing by modern farm field machinery.

It is unique and is an important advance in fertilizer technology because it fits beautifully into the present trend toward "one-step applications" in the Spring or more important to the latest practice of "double cropping"-one crop in the Spring, another in the Fall.

One quart of liquid fertilizer using Langbeinite ($2MgSO_4K_2SO_4$) and diammonium phosphate ($NH_4)_2HPO_4$ is made as follows: 6 oz. av. of Langbeinite ($2MgSO_4,K_2SO_4$) are added to a vessel containing 30 oz. of water at room temperature, operably associated with an agitator.

The solution is raised slowly to a boil which is maintained until the liquid is reduced to 13.5 oz and there are about 1.76 oz. av. of insols. which are removed by decantation.

8 oz.av. of diammonium phosphate ($NH_4)_2HPO_4$ are added to precipitate the released Mg, which occurs in about 6 minutes.

The reaction is halted by the addition of 1.75 oz. of muriate of potash, KCl having grade 62% $K_2O$.

Next 0.16 oz.av. of guar gum and 0.24 oz.av. of Borax ($Na_2B_4O_7:10H_2O$) are mixed with 17 oz.av. of ammonium nitrate $NH_4NO_3$ are added in bulk to the mixture which is stirred vigorously until it becomes liquid and is homogeneous. The resultant volume of 29 oz. is then raised by the addition of 3 oz. of water. Any amount can be made with these proportions. It is used by diluting 1 oz to 1 gal of wter which is poured around the roots of the plants as one would ordinarily water. This product has an analysis of 15-8.6-5+1 Mg.

The micro-nutrient sulfates $FeSO_4$, $MnSO_4$, $ZnSO_4$ and C $USO_4$, and will undergo the reactions shown above and can be added to any of the products of this invention.

The new features of this invention desired to be secured by Letters Patent are claimed as:

1. A farm field granular, soluble fertilizer of grade 21-12-7 +1.2 Mg comprising the reaction products obtained by admixing approximate parts by weight of 12. oz. av. of langbeinite ($2MgSO_4,K_2SO_4$), 16 oz. of water, 16 oz. av. of diammonium phosphate ($NH_4)_2HPO_4$, 6 oz.av. of muriate of potash, KCl, 0.24 oz. av. of borax $Na_2B_4O_7:10H_2O$, 1 oz.av. of guar gum and 34 oz.av. of ammonium nitrate $NH_4NO_3$.

2. A fertilizer as in claim 1 in which the micronutrients selected from the group consisting of one or more of the Mn, Fe, Cu, and Zn are added as chelates or sulfates and molybdenum is added as an acid or salt.

3. A farm field granular, partly soluble fertilizer of grade 17.4-10-8.64+1.63 Mg. comprising the reaction products obtained by admixing approximate parts by weight of 12 oz.av. of langbeinite ($2MgSO_4,K_2SO_4$) 16 oz.av. of diammonium phosphate ($NH_4)_2HPO_4$, 8 oz.av. of KCl, 0.24 oz.av. of borax $Na_2B_4O_7:10$ $H_2O$, 1.33 oz.av. of guar gum and 34 oz. av. of $NH_4NO_3$ in 15½ oz. of water to create a chemical system that will produce a solid farm field fertilizer where approximately one-half will behave as a reacted fertilizer with the remaining portion not performing as a reacted fertilizer until it has had sufficient time and moisture to react with the insolubles which were not removed.

4. A farm field fertilizer as in claim 3 in which the one or more of the micronutrients selected from the group consisting of Mn, Fe, Cu, and Zn Ca are added as chelates or sulfates, and molybdenum is added as an acid or salt.

5. A method of preparing a liquid fertilizer comprising the steps of:
   a. dissolving a quantity of ($2MgSO_4,K_2SO_4$) in water at room temperature in a vessel by mixing with an agitator;
   b. raising the temperature of the solution slowly to a vigorous boil with frequent agitation until the solution is reduced by about 55% and the solids by about 75%;
   c. adding a quantity of ($NH_4)_2PO_4$ to the mixture for reaction with the $MgSO_4$, the quantity of ($NH_4)_2HPO_4$ being in excess of the stoichiometric amount thereof reactable with the constitutents of the mixture;
   d. dissolving a sufficient quantity of KCL or NaCl to halt the above reaction;
   e. adding a quantity of $NH_4NO_3$ to the mixture for reaction with the constituents thereof, the quantity of said $NH_4NO_3$ being in excess of the stoichiometric amount reactable with said quantities of $MgSO_4$, ($NH_4)_2HPO_4$ and when so added are sufficient to produce an acidic buffered, saturated solution and suspension;
   f. recovering the saturated solution and suspension after equilibrium conditions have been established and consisting substantially of ($NH_4)_2SO_4$, $MgHPO_4$, $MgNH_4PO_4$, $NH_4NO_3$, $HNO_3$, $NH_4OH$, $HPO_4$—2, $H_2PO_4$—, free $NH_3$, $H_2O$ and substantial amounts of $K_2SO_4$.

6. A process as in claim 5 in which there is included the step of adding the one or more of the micronutrients selected from the group consisting of Mn, Fe, Cu, and Zn Cu. as chelates or sulfates and molybdenum is added as an acid or salt.

7. A process as set forth in claim 5 wherein approximate parts by weight are 12 oz.av. of ($2MgSO_4,K_2SO_4$), 16 oz.av. ($NH_4)_2HPO_4$, 6 oz.av. of KCl 0.24 oz.av. borax $Na_2B_4O_7:10$ $H_2O$, 1.0 oz.av. guar gum and 34 oz.av. $NH_4NO_3$ are added to 16 oz. of water to create a chemical system that will form a solid farm field fertilizer.

8. A process as set forth in claim 7 in which there is included the step of adding the one or more of the micronutrients selected from the group consisting of Mn, Fe, Cu, Zn, as chelates, or sulfates and molybdenum as an acid or salt.

9. A process as set forth in claim 5 wherein approximate parts by weight for each 6 oz. av. of ($2MgSO_4,K_2SO_4$) there are 30 oz. of water, 8 oz.av. ($NH_4)_2HPO_4$, 1.75 oz.av. KCl 60%$K_2O$, 0.16 oz.av. guar gum, 0.24 oz.av. of boarax $Na_2B_4O_7:10H_2O$, 17 oz.av. $NH_4NO_3$34%N, and an additional 3 oz. of $H_2O$ to produce 32 oz. of liquid fertilizer.

10. A process as set forth in claim 9 in which there is included the step of adding the one or more of the micronutrients selected from the group consisting of Mn, Fe, Cu, Zn as chelates or sulfates and molybdenum as an acid or salt.

* * * * *